United States Patent
Mahowald

(12) 
(10) Patent No.: US 6,481,150 B1
(45) Date of Patent: Nov. 19, 2002

(54) SNELL HOLDER TECHNOLOGY

(76) Inventor: Gerald A. Mahowald, 6045-232$^{nd}$ St., West, Faribault, MN (US) 55021

( * ) Notice: Subject to any disclaimer, the term of this patent is extended or adjusted under 35 U.S.C. 154(b) by 0 days.

(21) Appl. No.: 09/775,148

(22) Filed: Feb. 1, 2001

(51) Int. Cl.$^7$ ............................................. A01K 97/06
(52) U.S. Cl. ........................................ 43/57.2; 43/57.1
(58) Field of Search .................... 43/55, 57.2, 57.1, 43/54.1; 242/388.6

(56) References Cited

U.S. PATENT DOCUMENTS

| | | | |
|---|---|---|---|
| 2,232,621 A | * 2/1941 | Monroe | 43/57.1 |
| 2,596,896 A | * 5/1952 | Goad | 43/57.2 |
| 2,789,389 A | 4/1957 | Moen | |
| 2,830,399 A | * 4/1958 | Davis | 43/57.2 |
| 3,213,564 A | * 10/1965 | Borell | 43/57.2 |
| 3,255,550 A | * 6/1966 | Della Valle | 43/57.2 |
| 3,713,244 A | * 1/1973 | Alotta | 43/57.5 |
| 3,890,737 A | * 6/1975 | Jones | 43/57.5 |
| 3,991,507 A | * 11/1976 | Bart | 43/54.5 |
| 4,179,834 A | * 12/1979 | Thomas | 43/57.2 |
| 4,513,526 A | * 4/1985 | Grace et al. | 43/57.2 |
| 4,514,928 A | * 5/1985 | Hanson | 43/57.2 |
| 4,631,856 A | * 12/1986 | Born | 43/57.1 |
| 4,961,281 A | * 10/1990 | Listebarger, Jr. | 43/57.2 |
| 4,977,700 A | * 12/1990 | Perlman et al. | 43/57.2 |
| 5,018,298 A | 5/1991 | Spears | |
| 5,212,760 A | * 5/1993 | Goetz | 385/134 |
| 5,544,442 A | 8/1996 | Perkins | |
| D378,396 S | 3/1997 | Sandberg et al. | |
| 5,657,573 A | 8/1997 | Fischer et al. | |
| 6,134,825 A | * 10/2000 | Moffett et al. | 43/57.1 |
| 6,219,958 B1 | * 4/2001 | Eberts | 43/57.2 |

FOREIGN PATENT DOCUMENTS

DE 3318207 A1 * 1/1985 ............. 43/57.2

* cited by examiner

Primary Examiner—Peter M. Poon
Assistant Examiner—David Parsley
(74) Attorney, Agent, or Firm—R. C. Baker & Associates. Ltd.

(57) ABSTRACT

The snell holder has a foundation structure on which a snell-receiving body is mounted. The foundation structure has a support shaft and an anchor solely at one end for mounting it to another object. The snell-receiving body is elongated and compressible and puncturable and at least modestly resilient. It has a central axis about which it is rotatable. The support shaft projects into one end of the snell-receiving body at the axis of the body. The opposite end of the body has an eccentric handle. Spaced catches on the body allow attachment of the non-hook end of a snell to the body so that, upon rotation of the body by the eccentric handle, the snell can be wound around the body and the hook then pressed into the body.

28 Claims, 2 Drawing Sheets

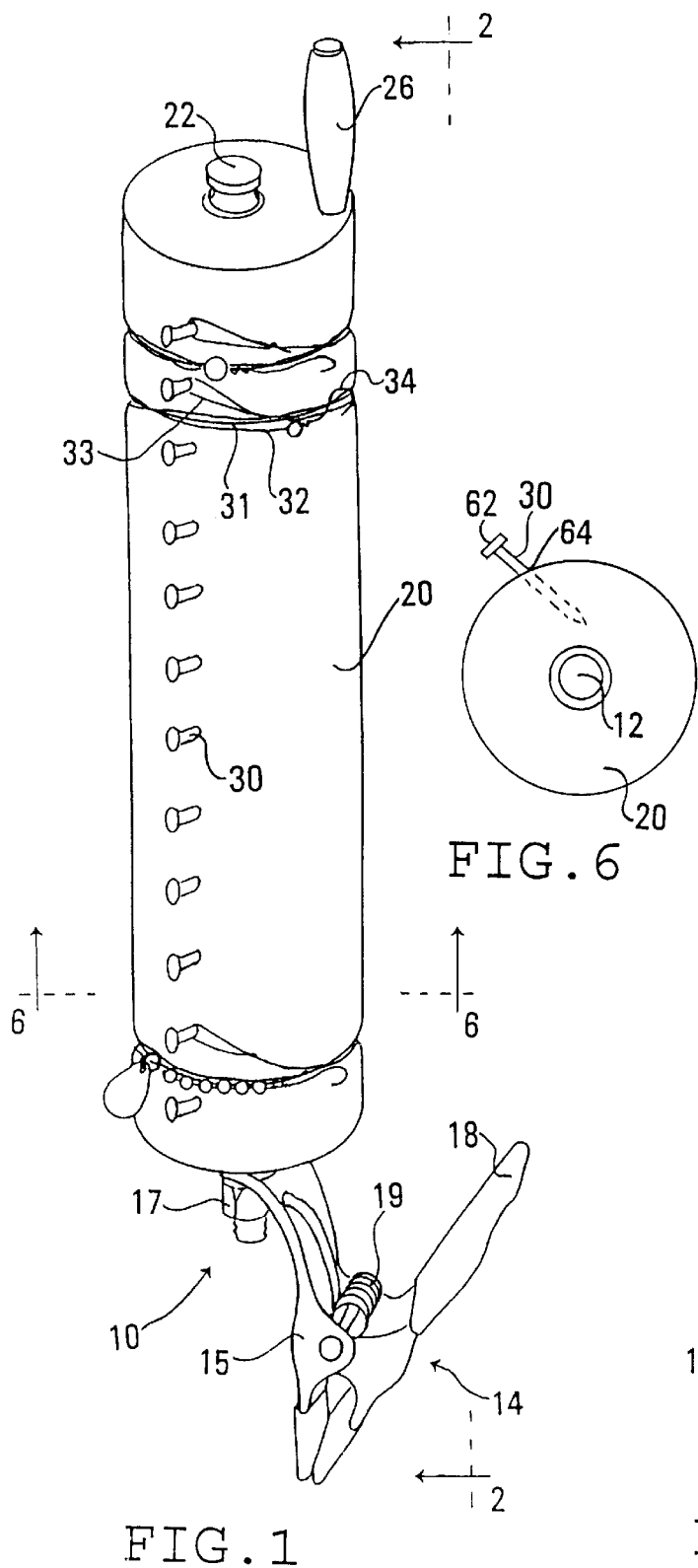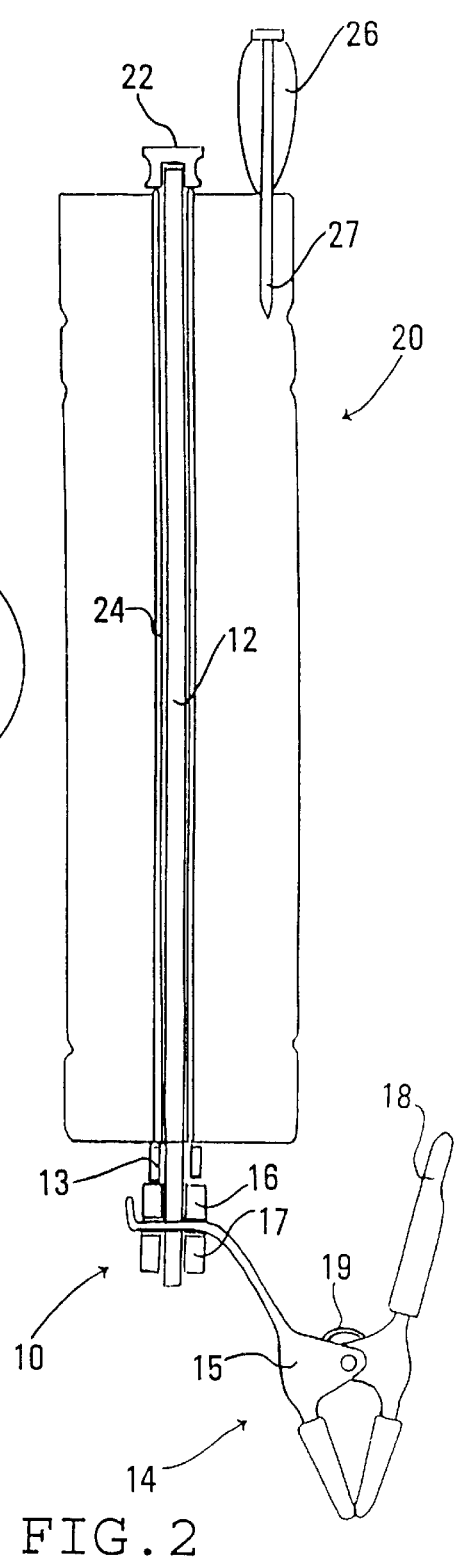
FIG. 1  FIG. 6  FIG. 2

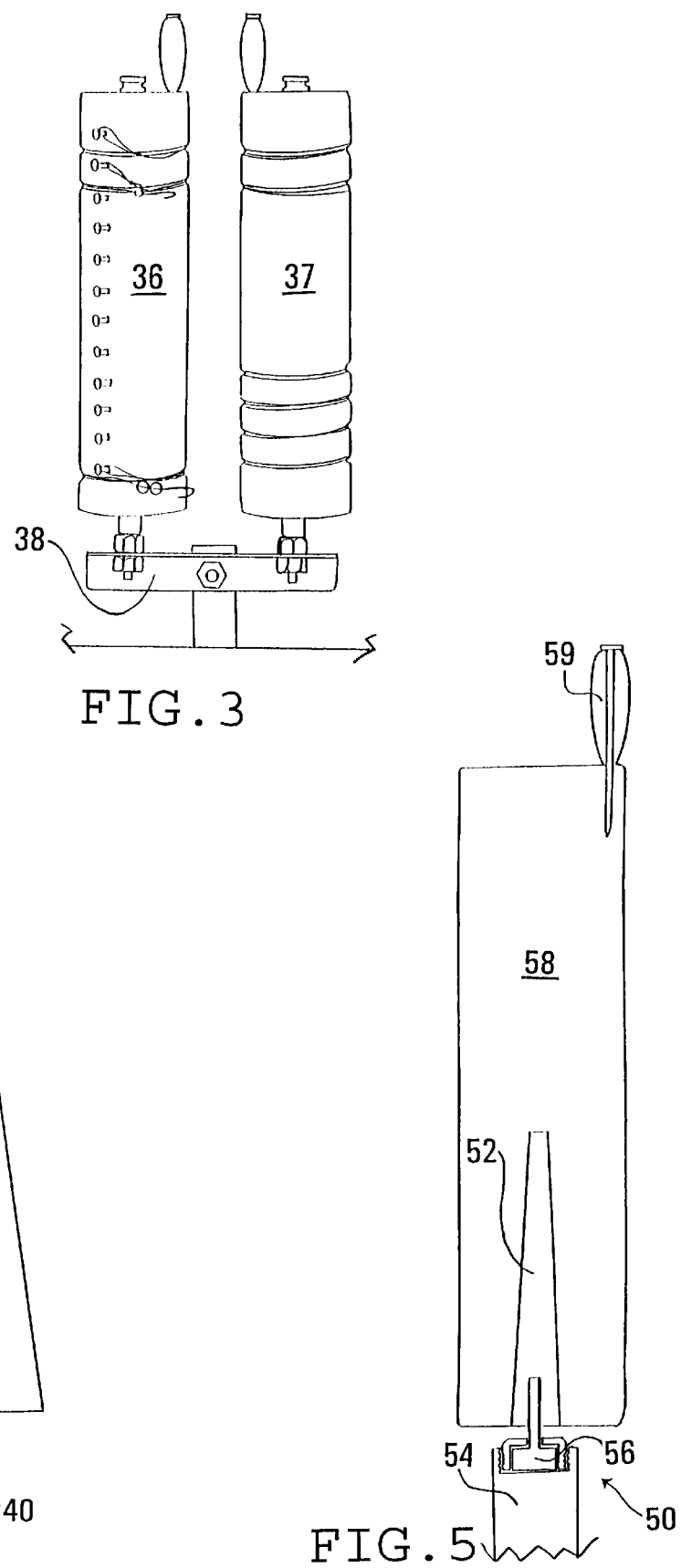

SNELL HOLDER TECHNOLOGY

BACKGROUND OF THE INVENTION

This invention relates to snell holders and more particularly to snell holders having an elongated snell-receiving body with an anchor at one end and an eccentric handle at the other.

Few things are as annoying and frustrating to fishermen as the problem of unraveling a tangled mass of snells as a preliminary to getting their equipment ready for fishing. Efforts to overcome the problem have led to the creation of a variety of snell holders (sometimes called fishing leader holders). To the extent known, they all suffer from serious defects. For example, a snell holder dangling from an overhead object not only presents a safety hazard but also some difficult handling problems when a snell is affixed or removed from it. Some snell holders are little more than "containers" in that they have to be handled as discrete items in the fisherman's hands while wrapping and unwrapping snells. They can't be anchored anywhere and their very nature makes them susceptible to being tumbled around on the floor of a boat or in a box of fishing gear. They present a safety hazard as well as a potential for snagging, and they require tedious motions to wrap and unwrap snells about them. Still other discrete snell holders have complex frames and support elements at each end of the holder; they likewise lack ease of handling for wrapping and unwrapping snells about the holder portion of the devices.

The long and short of it is that a snell holder that permits quick and easy and stable wrapping of snells about the same for storage purposes and quick and easy and reliable unwrapping without snagging has long been sought. This invention provides a clear and simple and reliable solution to that problem.

SUMMARY OF THE INVENTION

The new snell holder of this invention is easily loaded for storage of snells between periods of use and easily unloaded without snarling of snells at the time of selecting any stored snell for use. The method of use is exceedingly simple.

The new snell holder has an elongated, compressible, puncturable and at least modestly resilient snell-receiving body. At one end of that body, and solely at one end, is an anchor for mounting the body at a desired orientation for the elongated body. At the other end of the body is an eccentric handle for effecting hand rotation of the body with respect to the anchor. Along the outer surface of the elongated body is a pattern of spaced catches for attachment of the non-hook end of a snell to the body so that upon rotation of the body by the eccentric handle, the length of the snell line extending from the attached end at the catch can conveniently be wrapped around the body and the hook end pressed into the body to maintain the snell in wrapped condition on the body.

Ideally, a snell holder of the invention will have two main parts. One is a foundation structure having an elongated support shaft with a central axis and having an anchor fixed solely at one end of the support shaft for mounting the foundation structure on another object at a desired orientation for the support shaft. The other part is an elongated, compressible, puncturable, and at least modestly resilient snell-receiving body having a central axis about which the body is rotatable. The body is mounted on the foundation structure so that the support shaft of the foundation structure projects into the snell-receiving body from one end only, and with the axis of the body substantially coinciding with the central axis of the support shaft. An eccentric handle is mounted at the end of the body opposite the end receiving the projection of the support shaft, and the body additionally has a pattern of spaced catches on its outer surface along its elongated length for attachment of the non-hook end of a snell to the body.

The snell-receiving body of this invention may itself be marketed as an article of commerce for mounting on a foundation structure.

Still other advantages and features and benefits and characteristics of the invention will be evident as this description proceeds.

DESCRIPTION OF THE DRAWINGS

FIG. 1 is a perspective view of a snell holder of the invention wherein the snell-receiving body is cylindrical and the anchor at one end is a clip;

FIG. 2 is a diagrammatic cross-section taken on line 2—2 of FIG. 1 and particularly illustrates the central support shaft and the tube forming the internal channel of the snell-receiving cylindrical body;

FIG. 3 is a front view of a snell holder of the invention having more than one snell-receiving body mounted on a common anchor assembly;

FIG. 4 is a diagrammatic sectional view along the axis of a modified snell holder of the invention illustrating a snell-receiving body lacking an axis channel that extends entirely through its elongated length and illustrating a snell-receiving body of conical shape; (the anchor is partially broken away in FIG. 4);

FIG. 5 is another diagrammatic sectional view along the axis of a different snell holder of the invention wherein the snell-receiving body is mounted directly on a rotatable support shaft extending into but not through the mounted snell-receiving body; (the anchor is partially broken away in FIG. 5); and FIG. 6 is a diagrammatic cross-section taken on line 6—6 of FIG. 1 so as to clearly show the angular direction of the prongs, which is different from the radial direction.

DESCRIPTION OF THE PREFERRED EMBODIMENTS

Referring particularly to FIGS. 1 and 2, the snell holder illustrated has a foundation structure 10 made up of an elongated support shaft 12 with a central axis and an anchor 14 solely at one end of the support shaft. The anchor 14 is for mounting the foundation structure on another object at a desired orientation for the support shaft. In these FIGS. 1 and 2, the anchor is a clip having one of its clamping arms rigidly fixed to the bottom of the shaft 12 (as by a pair of threaded nuts 16, 17 on the threaded support shaft 12). The other clamping arm of the clip is biased to a clamping position against the base clamping arm, but is openable by a squeeze of the pinch handle 18 toward the part of the base arm 15 extending above the biasing pivot assembly 19.

In FIGS. 1 and 2, the support shaft 12 extends entirely through the snell-receiving body 20. A cap 22 (e.g., a nut) is threaded or otherwise fixed on the end of the shaft 12 opposite the end on which the anchor is fixed so as to block or stop body 20 from being accidentally demounted from shaft 12. A plastic washer 13 is useful at the lower end of shaft 12 to reduce frictional resistance to the rotation of the snell-receiving body.

Also, for the embodiment of FIGS. 1 and 2, the support shaft 12 and anchor 14 are fastened together in a manner preventing the rotation of the support shaft 12 with respect to anchor 14. The connection between the shaft 12 and anchor 14 is such that, when the anchor is mounted on another object such as on the wall of a fishing or tackle box or on any of a variety of structures on a boat, the orientation of the support shaft in any desired manner is accomplished. Generally the orientation will be in an upward manner for greatest convenience of use of the composite snell holder.

The snell-receiving body 20 has several important characteristics. First of all, it is elongated and compressible. By "compressible" is meant that it can be squeezed and its outer surfaces brought toward each other to some degree although not necessarily any great degree. Even a 1 or 2 percent or 5 percent reduction of the space between opposing sides of the body 20 can constitute sufficient compressibility. The function of compressibility is to facilitate holding the line of a snell on the body without axial shift of the line once it is wrapped around the body 20 and the hook of the snell is embedded in the body 20. It is puncturable in that a hook of a snell can be embedded in it. It is at least modestly resilient so that on removal of a snell from it, the portion of the body compressed by the line of the snell as wrapped about it will recover toward its original non-compressed shape-although the recovery need not be substantially instantaneous. Slow recovery is sufficient, and for that reason, the resilience of the body is characterized as being at least "modest." It may be fabulous, but fabulous resilience is not critically needed.

The snell-receiving body has a central axis about which the body is rotatable. The preferred shape for the body 20 is cylindrical. The body is mounted on the foundation structure so that the support shaft 12 projects into the snell-receiving body 20 from one end of it and so that the axis of the snell-receiving body substantially coincides with the central axis of the support shaft. To be noted is that a central axial channel defined by an axial tube 24 extends entirely through the snell-receiving body as illustrated in FIGS. 1 and 2. The support shaft 12 extends through the channel formed by the axial tube 24.

An important feature of the snell-receiving body is its eccentric handle 26 mounted at the end of the body opposite the end receiving the projection of the support shaft 12. Handle 26 is on the end opposite the anchor 14, and is suitably (but not critically) rotatable about its mounting pin shaft 27. Pin shaft 27 is analogous to a nail. It is embedded in body 20 and is suitably provided with an enlarged head to hold the handle 26 on it.

A further important feature of the body 20 is that it must have a pattern of spaced catches 30 on its outer surface along its elongated length (see FIG. 1). The catches 30 may vary in nature. They might be holes for receiving a bead or the like at the non-hook end of a snell. Preferably they are in the nature of prongs projecting out from the exterior surface of the snell-receiving body. Prongs that serve as suitable catches may be simple pegs, although the best prong catches-should have an enlarged head at the outermost end. Ideally, the prongs project out from the outer surface of the snell-receiving body at an angle with respect to the outer surface. The prong catches, however, should always extend from the outer surface of the snell-receiving body in a plane that is perpendicular to the axis of the snell-receiving body. Thus, the direction of projection of each prong catch is in a plane perpendicular to the axis of the snell-receiving body. In terms of the angle of projection from the outer surface of the snell-receiving body, the angle (see FIGS. 1 and 6) is best recited as being such that, on rotation of the snell-receiving body in one direction, the outermost end or head 62 of the prong catch is moved in a rotary direction ahead of the inner part 64 of the prong at the surface of the snell-receiving body. But on rotation of the snell-receiving body in the opposite direction, the inner part 64 of the prong precedes the outermost end 62. The benefit of angular prongs (with the outermost end preceding the inner part at the surface of the snell-receiving body during rotation in one direction) is quickly realized when a fisherman puts the loop of a snell over the prong and then rotates the snell-receiving body while wrapping the line on the body 20. The angle of the prong 30 serves advantageously as a hook during wrapping of the snell and serves as a quick release when the snell-receiving body is rotated in reverse to take off the snell. Note-that (see FIG. 6), in the case of a cylindrical snell-receiving body, the angle of the projecting prongs does not extend in a direction coinciding with a radial line outward from the axis for the body; rather, the prong's direction of extension from the surface of the cylindrical body is at an angle to the radial direction.

Looking down on the upper end of the structure illustrated in FIG. 1, a clockwise rotation would be the rotation for wrapping the line 31 of a snell 32 on the snell-receiving body 20 after the loop end 33 of the snell is placed over a prong 30. of course, counter-clockwise rotation would then be used to unwrap the snell from the body. While not very clearly illustrated in the drawing, the hook end 34 of the snell is pressed into the body of the snell after the snell is wrapped around the body.

It is emphasized that the snell-receiving body of this invention need not be of uniform character throughout. Only the outermost thickness or layer where the snell is wrapped needs to have the special properties of compressibility, puncturability, and a resilience of some order even though extremely low or modest. A practical size for a cylindrical snell-receiving body is an elongated length of about 10 inches (about 25.5 cm) and a width or diameter of about 2.5 inches (about 6.5 cm). Cylindrical bodies of the type illustrated in FIGS. 1 and 2 varying in elongated length from about 6 inches (about 15 cm) up to about 15 inches (about 40 cm) can be realistic for many snell storage usages. The width or diameter for such cylinders should never be below about 1 inch (about 2.5 cm) and preferably will be at least 1.5 inches (about 4 cm) in diameter up to approximately 3 inches (about 7.5 cm). Greater diameters for the cylinder may be employed but are unnecessary and only add bulk.

Although the cylinders must exhibit compressibility and puncturability and at least modest resilience, those characteristics can be imparted to the cylinder by employing materials for the radially outermost parts of the cylinder such as the outermost ¼ inch or 0.5 cm. It is at those radially outermost parts where those properties are needed. Foam plastic such as foamed polyethylene or any of a number of other foamed plastics are economical and ideal to employ for the important properties of the snell-receiving body. Solid plastics, even metal, may be employed for interior portions of the cylinder. Ideally, however, the entire snell-receiving body (except possibly the central tubular portion) is formed from a single mass of foamed or porous plastic material. The very central portion of the cylinder that forms the channel that extends about the support shaft 12 preferably should present a continuous plastic surface to reduce frictional contact with the support shaft. An ideal plastic surface is that exhibited by a plastic tube 24 extending through the axial center of the body. A plastic tube of polyvinyl chloride or any other slippery material is best to employ for reducing frictional contact with the support shaft 12.

The materials useful in fabricating the new devices of the invention are essentially unlimited. Ideally, foamed or porous plastic is employed for the important properties of the snell-receiving body; but it is not inconceivable that natural materials such as cotton could be employed (at least in part) to exhibit those properties. Foamed rubber could also, of course, be employed, whether natural or synthetic, but the added expense to use a rubber product or rubberized product is unnecessary.

In FIG. 3, two cylindrical snell-receiving bodies 36 and 37, each mounted on a support shaft (not shown), are held in desired orientation (for the support shafts as well as the snell-receiving bodies) by a single anchor 38 formed of an angle iron easily fixed or mounted to any other object.

Snell-receiving articles of the invention, while importantly having a support shaft that projects into the snell-receiving body, need not have support shafts that extend entirely through the elongated length of the snell-receiving body. This is illustrated in FIGS. 4 and 5.

In FIG. 4, the foundation structure 40 has a support shaft 42 that extends into the lower end of the snell-receiving body 44 but does not extend entirely through that snell-receiving body. The support shaft 42 is mounted on an anchor in the shape of a handle member 46. The handle anchor 46 is adapted to be rested and therefore mounted in a recess of the type for receiving the handle of a fishing rod.

(To be emphasized is that the handle anchor 46 is not held in the hand of a fisherman who is winding or unwinding snells on the snell-receiving body. For such winding operations, the handle anchor 46 is lodged in a recess for the handle of a fishing rod; and thus the support shaft 42 and snell-receiving body 44 are mounted in an angular relationship that frees the fisherman's hands for the winding operation and affixing the snell on the snell-receiving body.)

The relatively short support shaft 42 in FIG. 4 is topped by a resilient ball 43. The snell-receiving body is equipped with a tube of plastic 47 about its central axis and a somewhat enlarged hole or cavity 48 is at the upper end of the tube of plastic. (The cavity 48 is within the mass of the structure forming the snell-receiving body). In this structure of FIG. 4, the snell-receiving body 44 is simply pressed over the resilient ball (causing the ball 43 to be slightly compressed) and slid down the support shaft until the ball 43 enters the cavity 48 of the body 44. The resilient ball 43 expands in cavity 48 and holds the snell-receiving body against accidental dislodgment. A plastic washer is used to reduce friction at the lower end of the body 44 during rotation of it about the support shaft using the eccentric handle 41.

The FIG. 5 modification is another of interest in that the support shaft 52 of the foundation structure 50 is mounted to permit rotation of it. The shaft 52 at its lower end is fixed on the anchor 54 through an entrapped cylinder 56 at the lower end of the support shaft and confined within a cavity at the upper end of the anchor 54. Plastic materials such as nylon may be employed for the purpose of reducing frictional contact between the entrapped cylinder 56 and the cavity for it, but the option of a ball-bearing arrangement also exists for creating a structure of low friction for rotation of the support shaft. In this structure of FIG. 5, there is no need for an internal lining or a tube at the central axis of the snell-receiving body 58.

Indeed, the central slightly conical recess within the snell-receiving body 58 is friction fitted over the mating slightly conical support shaft so that rotation of the snell-receiving body 58 by using the eccentric handle 59 effectively also rotates the support shaft mounted on the anchor. To be recognized is that the support shaft and the internal recess or channel of the body 58 as illustrated in FIG. 5 may vary in shape at their frictional interfacing. For example, the frictional engagement may be accomplished by employing cylindrical shapes, or even a star-shaped shaft over which a star-shaped cavity in body 58 interlocks frictionally. It is also desirable to have a frictional contact between the surface of the shaft and the internal cavity of the snell-receiving body for the structure of FIG. 5 so that the snell-receiving body remains attached to the shaft when one moves the assembly from an anchored condition on another object to a container or tackle box for storage.

Ideally, the snell holders of the invention employ snell-receiving bodies that are of a cylindrical or octagonal or some similar shape and of uniform size along their entire elongated length. Cylindrical or substantially cylindrical shapes are preferred because it is easier to wrap the length of a snell around such shapes as the snell-receiving body is rotated than it is to wrap a snell around odd cross-sectional shapes such as ovals or extremely long and narrow rectangles. Within the ambit of the most useful shapes, however, are those that may have longitudinal grooves on the exterior as well as those that may have longitudinal projections on the exterior. Exact cross-sectional shapes for a snell-receiving body at planes perpendicular to its axis can thus vary considerably without detracting from the essentials of the invention; but the most ideal practice, it is emphasized, is that where a cylindrical or substantially cylindrical body is used, with or without exterior longitudinal projections or longitudinal grooves.

When using this new device, a fisherman simply anchors the new structure in a manner that allows easy hand access to the eccentric handle so that, while rotating the new snell-receiving body with one hand, the fisherman can conveniently use the other hand to guide the line of a snell for neat wrapping about the snell-receiving body.

Convenience of use is facilitated by the fact that the snell-receiving body lacks clutter about it. In fact, it is free of all structure that would or could interfere with convenient use.

The function of a plastic washer (e.g., as at 13 in FIG. 2) in reducing frictional resistance for body rotation can be realized by an extension of the length of a central plastic tube (such as 14 in FIG. 2) so that it projects slightly below the snell-receiving body and in effect replaces the need for a separate plastic washer.

Those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims rather than the foregoing description, and all variations that come within the meaning and range of equivalency of the claims are therefore intended to be embraced thereby.

That which is claimed is:

1. A snell-receiving body for mounting on an anchorable foundation structure to form a snell holder easily loaded for storage of snells and easily unloaded without snarling of snells at the time of selecting any stored snell for use, said snell-receiving body consisting essentially of an elongated, substantially cylindrical shape having a central axis about which said shape is rotatable and having an axial channel extending into said shape from one end thereof, said shape being compressible, puncturable, and at least modestly resilient, said axial channel being for receiving the projection of a support shaft of an anchorable foundation structure into said cylindrical shape from said one end thereof, said cylindrical shape having an eccentric handle mounted at an eccentric location to the end of said shape opposite said one end, and said shape additionally having a pattern of spaced catches on its outer surface along its elongated length for receiving attachment of a snell to said shape so that, upon rotation of said shape by said eccentric handle, the snell can conveniently be wrapped around said shape.

2. A snell holder easily loaded for storage of snells between periods of use and easily unloaded without snarling of snells at the time of selecting any stored snell for use, comprising:

(a) a foundation structure having an elongated support shaft with a central axis and having an anchor fixed solely at one end of said support shaft for mounting said foundation structure on another object at a desired orientation for said support shaft, and (b) an elongated compressible, puncturable, and at least modestly resilient snell-receiving body having a central axis about which said body is rotatable, said body being mounted on said foundation structure so that said support shaft projects into said body from one end of said body with the axis of said body substantially coinciding with said central axis of said support shaft, said body having an eccentric handle mounted at the end of said body opposite the end receiving the projection of said support shaft, there being no duplication of said foundation structure at said end of said body carrying said eccentric handle, and said body additionally having a pattern of spaced catches on its outer surface along its elongated length for receiving attachment of a snell to said body so that, upon rotation of said body by said eccentric handle, the snell can conveniently be wrapped around said body.

3. The snell holder of claim 2 wherein said snell-receiving body is removably mounted on said foundation structure so as to allow a different said snell-receiving body to be mounted on said foundation structure.

4. The snell holder of claim 2 wherein said support shaft does not extend entirely through said snell-receiving body to the end thereof on which said eccentric handle is mounted.

5. The snell holder of claim 2 wherein said support shaft extends entirely through said snell-receiving body and a cap on the end of said support shaft opposite said anchor end holds said snell-receiving body against accidental escape from said support shaft.

6. The snell holder of claim 2 wherein said support shaft is fixed against rotation with respect to said anchor.

7. The snell holder of claim 2 wherein said support shaft is stationary and said snell-receiving body is equipped with an internal channel in which said support shaft extends in a spaced relationship from the internal surface of said internal channel, said internal channel having a plastic surface so as to minimize friction for rotation of said snell-receiving body about said support shaft.

8. The snell holder of claim 2 wherein said support shaft is rotatably fixed at said one end of said support shaft and wherein said snell-receiving body is friction fitted on said rotatable support shaft.

9. The snell holder of claim 2 wherein said anchor comprises a clip.

10. The snell holder of claim 2 wherein said anchor comprises an elongated mass of material adapted to fit within a recess for holding the handle of a fishing rod.

11. The snell holder of claim 2 wherein said foundation structure has a second support shaft and wherein a second elongated compressible, puncturable, and at least modestly resilient snell-receiving body is mounted on said second support shaft.

12. The snell holder of claim 2 wherein said catches comprise outwardly projecting prongs.

13. The snell holder of claim 2 wherein said catches comprise outwardly projecting prongs having an outermost end away from the surface of the snell-receiving body and having an inner part on the surface of the snell-receiving body, and wherein each prong extends at an angle from the surface of the snell-receiving body, said angle being such that when said snell-receiving body is rotated in one direction, said outermost end is ahead of said inner part on the surface of the snell-receiving body, and when said snell-receiving body is rotated in the opposite direction, said inner part on the surface of the snell-receiving body is ahead of said outermost end of the prong.

14. The snell holder of claim 2 wherein said snell-receiving body is substantially cylindrical.

15. A snell holder easily loaded for storage of snells between periods of use and easily unloaded without snarling of snells at the time of selecting any stored snell for use, comprising:

(a) a foundation structure having an elongated support shaft and having an anchor fixed solely at one end of said support shaft for mounting said foundation structure on another object at a desired orientation for said support shaft, and (b) an elongated compressible, puncturable, and at least modestly resilient snell-receiving body having a central axis about which said body is rotatable, said body being mounted on said foundation structure so that said support shaft projects into said body from one end of said body at the central axis of said body, said body having an eccentric handle mounted at an eccentric location to the end of said body opposite the end receiving the projection of said support shaft, there being no duplication of said foundation structure at said end of said body carrying said eccentric handle, and said body additionally having a pattern of spaced catches on its outer surface along its elongated length for receiving attachment of a snell to said body so that, upon rotation of said body by said eccentric handle, the snell can conveniently be wrapped around said body.

16. The snell holder of claim 15 wherein said snell-receiving body is removably mounted on said foundation structure so as to allow a different said snell-receiving body to be mounted on said foundation structure.

17. The snell holder of claim 15 wherein said support shaft does not extend entirely through said snell-receiving body to the end thereof on which said eccentric handle is mounted.

18. The snell holder of claim 15 wherein said support shaft extends entirely through said snell-receiving body.

19. The snell holder of claim 15 wherein said support shaft is fixed against rotation with respect to said anchor.

20. The snell holder of claim 15 wherein said support shaft is stationary and said snell-receiving body is equipped with an internal channel in which said support shaft extends in a spaced relationship from the internal surface of said internal channel, said internal channel having a plastic surface so as to minimize friction for rotation of said snell-receiving body about said support shaft.

21. The snell holder of claim 15 wherein said support shaft is rotatably fixed at said one end of said support shaft and wherein said snell-receiving body is friction fitted on said rotatable support shaft.

22. The snell holder of claim 15 wherein said anchor comprises a clip.

23. The snell holder of claim 15 wherein said anchor comprises an elongated mass of material adapted to fit within a recess for holding the handle of a fishing rod.

24. The snell holder of claim 15 wherein said foundation structure has a second support shaft and wherein a second elongated compressible, puncturable, and at least modestly resilient snell-receiving body is mounted on said second support shaft.

25. The snell holder of claim 15 wherein said catches comprise outwardly projecting prongs.

26. The snell holder of claim 15 wherein said catches comprise outwardly projecting prongs having an outermost end away from the surface of the snell-receiving body and having an inner part on the surface of the snell-receiving body, and wherein each prong extends at an angle from the surface of the snell-receiving body, said angle being such that when said snell-receiving body is rotated in one direction, said outermost end is ahead of said inner part on the surface of the snell-receiving body, and when said snell-receiving body is rotated in the opposite direction, said inner part on the surface of the snell-receiving body is ahead of said outermost end of the prong.

27. The snell holder of claim 15 wherein said snell-receiving body is substantially cylindrical.

28. A method of loading snells on a snell holder for storage and for easy unloading of the snells without snarling at the time of selecting any stored snell for use, said snell being defined as having a hook end, a non-hook end, and a line therebetween, said method comprising:
  (i) forming a snell holder characterized by the following features:
    (a) a foundation structure having an elongated support shaft with a central axis and having an anchor fixed solely to one end of said support shaft for mounting said foundation structure on another object at a desired orientation for said support shaft, and
    (b) an elongated compressible, puncturable, and at least modestly resilient snell-receiving body having a central axis about which said body is rotatable, said body being mounted on said foundation structure so that said support shaft projects into said body from one end of said body with the axis of said body substantially coinciding with said central axis of said support shaft, said body having an eccentric handle mounted at the end of said body opposite the end receiving the projection of said support shaft, there being no duplication of said foundation structure at said end of said body carrying said eccentric handle, and said body additionally having a pattern of spaced catches on its outer surface along its elongated length for receiving attachment of a snell to said body so that, upon rotation of said body by said eccentric handle, the snell can conveniently be wrapped around said body,
  (ii) mounting the said foundation structure of said snell holder on another object in a manner such that said eccentric handle is conveniently accessible to a user,
  (iii) attaching the non-hook end of a snell to one of said catches of said snell-receiving body,
  (iv) rotating said snell-receiving body by said eccentric handle with one hand while using the other hand to entrain the line of said snell about said snell-receiving body during said rotation thereof, and
  (v) pressing the hook end of said snell into said body to maintain said snell in wrapped condition about said body.

* * * * *